US011490600B2

(12) United States Patent
Elpel (10) Patent No.: US 11,490,600 B2
(45) Date of Patent: Nov. 8, 2022

(54) APIARY TOOL WITH LEVER CAM FOR VERTICAL REMOVAL AND TRANSPORT OF A BEE FRAME

(71) Applicant: Nicholas Andrew Elpel, Pony, MT (US)

(72) Inventor: Nicholas Andrew Elpel, Pony, MT (US)

(*) Notice: Subject to any disclaimer, the term of this patent is extended or adjusted under 35 U.S.C. 154(b) by 0 days.

(21) Appl. No.: 17/180,765

(22) Filed: Feb. 20, 2021

(65) Prior Publication Data
US 2022/0264853 A1    Aug. 25, 2022

(51) Int. Cl.
| *A01K 55/00* | (2006.01) |
| *A01K 47/06* | (2006.01) |
| *A01K 47/02* | (2006.01) |
| *A01K 59/00* | (2006.01) |

(52) U.S. Cl.
CPC ............. *A01K 47/06* (2013.01); *A01K 47/02* (2013.01); *A01K 55/00* (2013.01); *A01K 59/00* (2013.01)

(58) Field of Classification Search
CPC ................................ A01K 55/00; A01K 59/00
USPC ................... 449/51; 269/238, 239, 3, 6, 228; 254/120, 131
See application file for complete search history.

(56) References Cited

U.S. PATENT DOCUMENTS

| 153,902 | A | * | 8/1874 | Lewis | ................. | B25F 1/00 |
| | | | | | | 7/125 |
| 453,905 | A | * | 6/1891 | Holt | .................. | A01K 55/00 |
| | | | | | | 294/81.6 |
| 775,691 | A | * | 11/1904 | Valdivielso et al. | ... | A01K 55/00 |
| | | | | | | 449/51 |
| 847,766 | A | * | 3/1907 | Hanson | .................. | B66F 15/00 |
| | | | | | | 254/120 |
| 865,062 | A | | 9/1907 | Sawyer | | |
| 1,184,491 | A | | 5/1916 | Ross | | |
| 1,559,868 | A | | 11/1925 | Hall | | |
| 1,755,941 | A | * | 4/1930 | Wilson | ................. | A01K 55/00 |
| | | | | | | 449/62 |
| 1,848,485 | A | * | 3/1932 | Keller | .................. | A01K 55/00 |
| | | | | | | 449/62 |
| 2,251,529 | A | | 8/1941 | Sterling | | |
| 2,350,890 | A | * | 6/1944 | Hartley | ................. | A01K 55/00 |
| | | | | | | 294/106 |

(Continued)

FOREIGN PATENT DOCUMENTS

| CA | 2152881 A1 | * | 12/1996 | | |
| SU | 882491 | | 11/1981 | | |
| WO | WO-2018079902 A1 | * | 5/2018 | ........... | A01K 45/007 |

OTHER PUBLICATIONS

Jim Thompson, Best Bee Hive Tool?, Bee Culture; The Magazine of American Beekeeping, URL <http://www.beeculture.com/best-hive-tool/>, Mar. 23, 2016, retrieved from . . . Internet Archive Wayback Machine <https://web.archive.org/web/20160329061321/http://www.beeculture.com/best-hive-tool/>.

*Primary Examiner* — Lisa L Tsang (57) ABSTRACT

An apiary tool for breaking free and vertically lifting, removing, inspecting and transporting a frame from a bee hive box. The apiary tool having one or more handles, a cross member and one or more lever cams, where a lever cam includes a cam that slides underneath a bee hive frame top bar and an arcuate rolling surface. Rotation of a handle providing dual action that forces the arcuate rolling surface to hold down an adjacent frame while the lever cam pushes upward on the desired frame.

18 Claims, 4 Drawing Sheets

(56) References Cited

U.S. PATENT DOCUMENTS

| | | | |
|---|---|---|---|
| 2,369,815 A | | 2/1945 | Coakley |
| 2,593,304 A | | 4/1951 | Howard |
| 2,997,326 A | * | 8/1961 | Daum .................... A01K 55/00 |
| | | | 294/118 |
| 3,022,995 A | * | 2/1962 | Sorenson ............. D06F 39/001 |
| | | | 269/309 |
| 3,523,314 A | | 8/1970 | Homins |
| 3,758,896 A | | 9/1973 | Croan |
| 3,911,513 A | | 10/1975 | Pierce |
| D248,086 S | | 6/1978 | Maxant |
| 4,395,788 A | | 8/1983 | Crichton et al. |
| 4,433,829 A | * | 2/1984 | Grover .................... B65G 7/12 |
| | | | 254/131 |
| 4,453,281 A | | 6/1984 | Shanabarger |
| 4,573,228 A | | 3/1986 | Bachalo |
| 4,872,697 A | * | 10/1989 | Berkowitz ............. B62B 5/067 |
| | | | 280/304.5 |
| 7,063,592 B2 | | 6/2006 | Pointer |
| 8,020,835 B2 | * | 9/2011 | Bulow ................. H05K 7/1411 |
| | | | 254/130 |
| 8,328,164 B2 | | 12/2012 | Feiler et al. |
| 8,342,482 B2 | * | 1/2013 | Smith .................... E04G 23/08 |
| | | | 254/27 |
| 8,915,763 B1 | | 12/2014 | Lentz |
| 10,285,384 B2 | | 5/2019 | Victory et al. |

* cited by examiner

APIARY TOOL WITH LEVER CAM FOR VERTICAL REMOVAL AND TRANSPORT OF A BEE FRAME

FIELD OF THE INVENTION

A new and useful apiary tool for breaking free, vertically lifting, removing, inspecting and transporting a bee hive frame from a bee hive box, the tool having two handles, a cross member there-between, and lever cams for breaking propolis tack and for supporting the bee frame.

BACKGROUND OF THE INVENTION

Honey bees make honeycomb on a frame and then fill the honeycomb with honey, larvae or pollen. Honey bees also fill small gaps between bee boxes and frames with propolis, a glue-like substance they derive from resinous trees and bushes, as shown and discussed in U.S. Pat. No. 3,523,314 to Homins. Bees use propolis like a caulk. Propolis is a tenacious material which tacks bee hive lids and frames to bee boxes, and frames to each other.

Bee hive tools for removing frames from bee boxes are needed because the frames are glued down inside the bee box with propolis, wax and honey (shortened herein to "propolis tack"), and because spacing between the frames is too small for fingers to adequately pinch and lift a frame.

Various one-handed putty knives or pry bar type tools have been used by bee keepers. Use of these tools requires sequentially working around a single frame, wiggling a corner of the tool under an edge of the frame and gently prying upward to break the propolis tack. These prying tools are slow and tedious due to the multiple steps of wiggling and prying around each end of every frame. An impatient bee keeper may get too small of a purchase on a frame or pry too hard breaking the frame. Broken frames typically cannot be reused and they require extra care while processing in a honey extraction spinner prior to disposal.

If a bee keeper is successful at prying one end of a frame up, then they must pinch, lift and hold the frame with their thumb and finger. The bee keeper can only lift the frame on one side a short distance before a lower part of the frame binds at an angle inside the bee box. The bee keeper next pries loose the opposite end of the frame which is similarly pinched. Many bee keepers do not use protective gloves for this step because it is difficult to pinch the closely spaced frames while lifting due to the extra bulk of gloves. The frames are heavily ladened with four to six pounds of honey, which may not seem like much weight but it is for a repetitive motion and thus is terribly demanding and requires great finger strength. In addition, these tools are set down risking squished bees, or are awkwardly doubled-up in the bee keeper's hand with the frame while the bee keeper inspects and transports the frame.

Bee hive frame clamps are another type of bee hive tool. These clamps reach between frames and clamp onto a central portion of the top bar of a frame. After clamping the apiarist lifts the frame. However, bees tend to congregated in central areas of the frame and top bar. And, the top bar central area is relatively weak and not suitable for large quick forces needed to dislodge propolis tack. So, a second tool is needed to pry under the frame ends to break the frame free from the box and adjacent frames. Less tools and less engagement of the bee hive frame is needed because each time clamping, prying, or pinching takes place bees are impacted and squished.

The purpose of this inventive apiary tool is to overcome the aforementioned problems, and improve frame removal, inspection, transport and harvest efficiencies.

BRIEF SUMMARY OF THE INVENTION

The present invention provides a single, fast acting apiary tool for efficiently breaking a frame free of propolis tack in a bee box, for providing a vertical lift motion of the frame, and for removing and holding the frame for inspection, and for transport and harvest.

In accordance with the present invention, an objective is to break loose a bee hive frame from propolis tack in a bee hive box. Another objective is to vertically lift the bee hive frame from the bee hive box once it is broken free. These objectives are achieved in a bee friendly manner with the least amount of bees being squished or negatively impacted.

Another objective is to provide handles for balanced lifting and holding of a bee hive frame. These handles act as levers for providing upward force. The handles can have straight and flared outward guide faces for centering the apiary tool on a bee box, the flared out part also providing more finger space between the tool and bee hive frame.

Another objective is to provide a lever cam on a cross member extending between the handles. The lever cam is preferably two lever cams. A lever cam is partially inserted in between adjacent bee hive frame top bars and under one of the top bars. A lever cam has a cam to provide a rolling lift force on and underneath the frame top bar as the handles are rotated. Another objective is for the cam to be sized to fit between a bee hive frame side member and adjacent bee box wall such that lifting is adjacent distal ends of the frame top bar in an area that is strong and relatively free of bees.

Another objective is to provide the lever cam with an arcuate rolling surface that leverages off of the adjacent frame or bee hive box. Still another object is for the cam together with an arcuate rolling surface to provide a dual action vertical lift on a frame sufficient to swiftly break propolis tack between a frame and bee box and between adjacent frames.

Still another objective of the apiary tool is to support and hold the frame on the lever cams by holding the handles and providing thumb or finger pressure on the frame onto the lever cams and cross member so that the tool and frame can be moved up, down and sideways with the apiarist's wrists and arms to inspect both sides of the frame. Still another objective is to provide a convenient blade on the apiary tool. And another objective is to provide a collapsing tool that can be easily stored.

These objectives as well as others now or later appreciated are accomplished by this apiary tool.

DETAILED DESCRIPTION OF PREFERRED EMBODIMENTS

Figure 1:
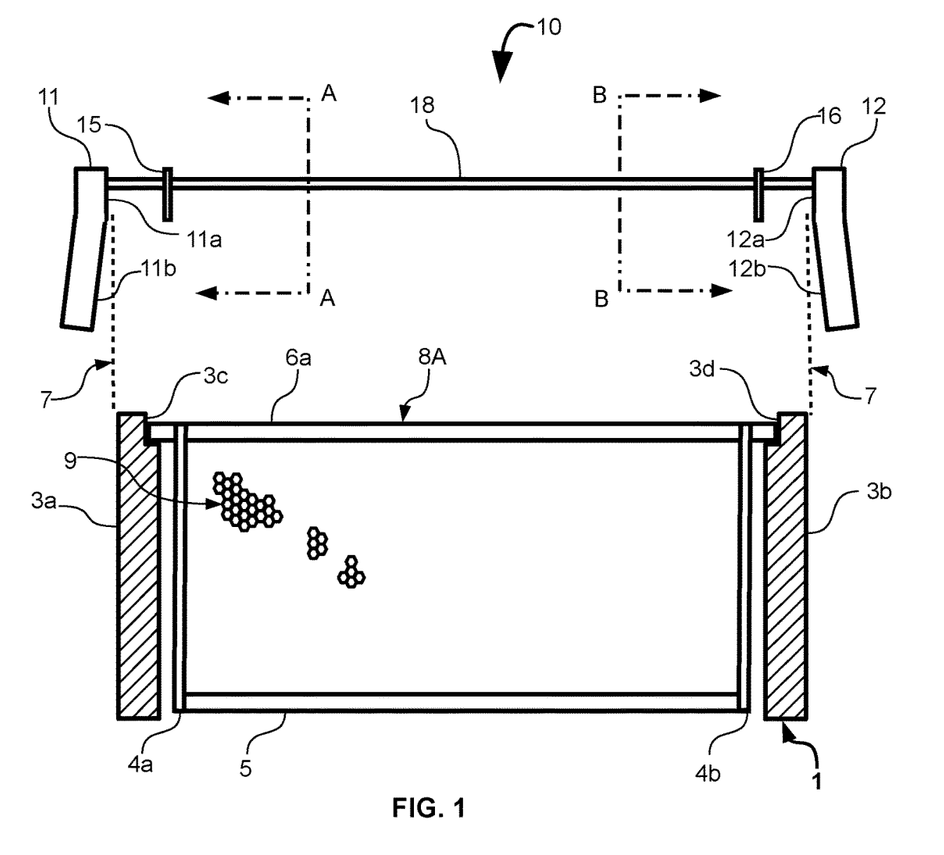
FIG. 1 is a front view of the present apiary tool 10 with a honey frame inside of a bee box 1 (shown in partial cross-section).

In a preferred embodiment shown in FIG. 1, an apiary tool 10 has a first handle 11 and a second handle 12 connected together adjacent ends thereof with a cross member 18. A first lever cam 15 and a second lever cam 16 are attached to cross member 18.

Apiary tool 10 is structured to slide down onto to a bee box 1 as suggested by guide lines 7. Bee box 1, for example, could be a honey super that is set on top of bee hive base or another honey super, hence the lack of an illustrated bottom. The bee box may also be a brood box or other bee box capable of supporting frames. In FIG. 1 bee box 1, shown in cross-section, has walls 3a and 3b having respective ledges 3c and 3d. Honey frame 8A supports honey comb 9, shown representatively. Frame 8A includes side members 4a and 4b, a base member 5, and a top bar 6a, the top bar 6a resting on bee box ledges 3c and 3d. Top bar 6a is typically narrower than the tops of side members 4a and 4b. See for example frame 8A in FIG. 9 showing top bar 6a narrower than the top of side member 4a.

Figure 4:
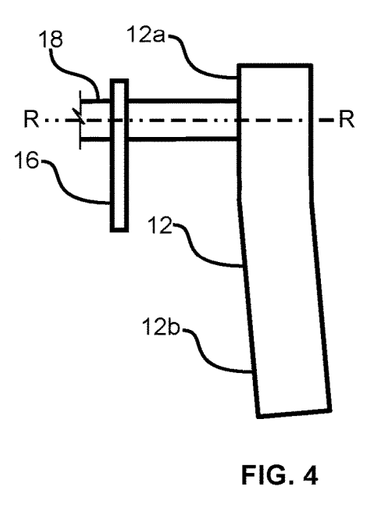
FIG. 4 is a partial close-up front view of the apiary tool right hand side.

As shown in FIG. 1, apiary tool 10 is used parallel to frame 8A. Handles 11 and 12 of apiary tool 10 slide over the outside of bee box walls 3a and 3b. Handles 11 and 12 are generally guided by lower guide surfaces 11b and 12b, and then more finely guided by upper guide surfaces 11a and 12a. Apiary tool 10 is structured so that handle upper surfaces 11a and 12a slightly clear the outside of bee box 1 to allow for rotation of the tool axially about cross member 18. Handle lower guide surfaces 11b and 12b diverge from respective upper guide surfaces 11a and 12a and guide lines 7 at about 5 to 15 degrees which helps in initially centering apiary tool 10 on bee box 1 and for grasping with right and left hands on a lower part of handles 11 and 12. See FIG. 4 which shows lower guide surface 12b diverging from upper guide surface 12a. In a preferred embodiment, the handles are elongate and generally about 4 inches long.

Figure 9:
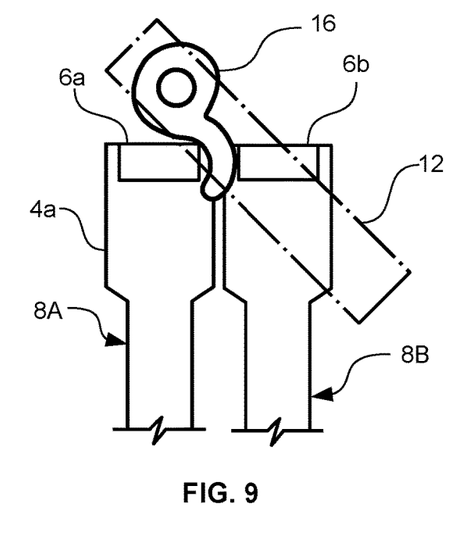
FIG. 9 is a right side view of the apiary tool in action in a first position.

As apiary tool 10 is sliding down onto bee box 1, lever cam 16 descends into a gap between bee box wall 3b and frame side member 4b, as shown in FIG. 1, and into a space between side-by-side frames, see the space between top bars 6a and 6b in FIG. 9. This gap and space are for bee movement inside of the bee box. Similarly, lever cam 15 descends into a gap between box wall 3a and frame side member 4a, as shown in FIG. 1, and into a space between side-by-side frames (not shown but similar to FIG. 9). Lever cams 15 and 16 are about 3/16 inch thick so as to fit into the aforementioned gaps which are about 3/8 inch long. Lever cams 15 and 16 working in these gaps are not likely to interfere with or squish bees and in particular not a queen bee because she is generally located in a central area of the frame. For a standard bee box, lever cams 15 and 16 are preferably located about one inch from respective handles 11 and 12, but more broadly could be about 3/4 inch to about 3 inches, but ultimately bee box dependent. Standard bee boxes measure about 19 7/8 inches in length by 16 1/4 inches wide, the length being parallel to the bee frames.

Figure 2:
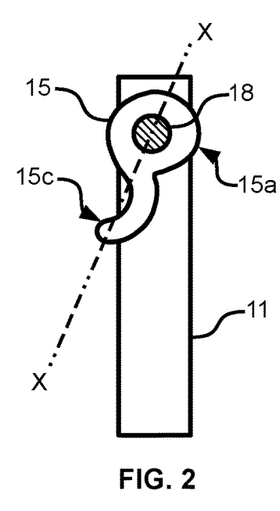
FIG. 2 is a right side view of the apiary tool taken along cross-section line A-A.
Figure 3:
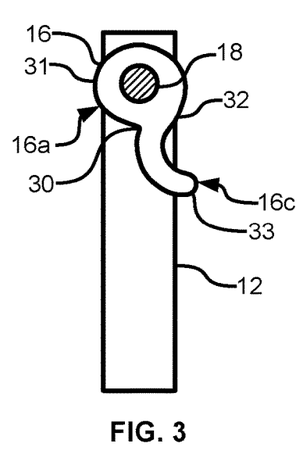
FIG. 3 is a left side view of the apiary tool taken along cross-section line B-B.

FIGS. 2-3, show first and second lever cams 15 and 16 in further detail. Lever cams 15 and 16 are attached and crosswise to cross member 18 (shown in cross section) and are space from each other as shown in FIG. 1. Lever cams 15 and 16 each have an elongate axis, see for example, elongate axis X shown as line X-X in FIG. 2. Lever cam elongate axis X is preferably angled from a flat side of handle 11 to about 30 degrees so as to provide a comfortable handle rotation of the apiary tool 10 and to securely support a frame as will be explained. It is appreciated elongate axis X is more broadly about 10 to 40 degrees from handle 11. An elongate axis of lever cam 16 is similar positioned. Again, lever cams 15 and 16 are spaced to respectively insert into a gap between bee box walls 3a and 3b and respective frame side members 4a and 4b, the exact location of the lever cams is ultimately bee box size dependent. Lever cams 15 and 16 are preferably rectangular in profile as shown in FIGS. 1, 4-5 and 13-14 and are preferably about 1.75 inches long at elongate axis X. Cross member 18 is depicted as a sturdy metal rod which is preferably about 3/8 inch in diameter and about 20 inches long which slightly clears the aforementioned standard bee box length, however the diameter and length may change. For example, the length could change to accommodate a weathered swollen bee box, or a different type of bee box such as a top bar style of bee box, such that, cross members of about 14 to about 25 inches may not be uncommon. Cross member 18 has an axis of rotation R, see line R-R in FIG. 4.

Figures 5, 6:
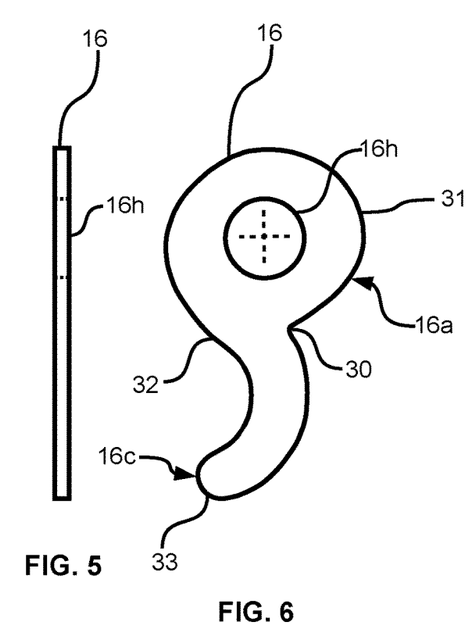
FIG. 5 is an enlarged front view of a lever cam 16 of the apiary tool.
FIG. 6 is an enlarged right side view of a lever cam 16 of the apiary tool.

FIGS. 5-6 show lever cam 16 in an enlarged view. Lever cam 16 can have a center hole 16h for sliding on cross member 18. In a preferred embodiment, lever cams 15 and 16 are welded in position and perpendicular to cross member 18. It is appreciated that in another embodiment lever cams can be moved along rod 18 to accommodate various sized bee boxes, as suggested by slide arrows S in FIG. 13.

FIG. 6 shows a right side view of lever cam 16 comprising a cam 16c having a gliding surface that extends from about point 32 to about point 33. Cam 16c gliding surface at or near point 32 is closer to the center of hole 16h than gliding surface at or near point 33. A cam follower, in this case a bee hive frame, is generally moved along the gliding surface from about point 32 farther away to about point 33, as will be explained further.

Lever cam 16 also has an arcuate rolling surface 16a. Arcuate rolling surface 16a extends from about point 30 to about point 31 and is located on an opposite side of of the lever cam from cam 16c. Arcuate rolling surface 16a holds down an adjacent frame and provides a fulcrum for the lever cam and lever action of the handles. It is appreciated that arcuate rolling surface 16a could have point 30 closer to the center of hole 16h than point 31, thus providing an arcuate cam. In a preferred embodiment the lever cam is generally "comma" shaped. For example, comma shaped comprising a generally circular portion with descending tang, but could be alternatively shaped, and as such, is well within the level of one of ordinary skill appreciating the purpose and objectives of the present invention. Lever cam 15 is similar to lever cam 16, thus the surfaces and operation as described for lever cam 16 are similar for lever cam 15.

Frames 8A and 8B in FIGS. 9-12 are shown with nicely squared corners and edges, however in practices frame corners and edges become rounded with use, and frames become layered with propolis and wax, and also frames vary in manufacture, such that, frame contact with lever cam points 30 thru 33 is discussed as generally "at or near."

Figure 7:
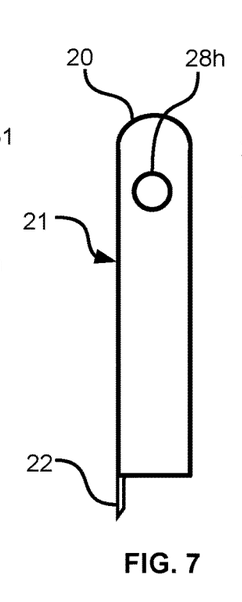
FIG. 7 is a left side view of an alternate handle 21 with blade.
Figure 8:
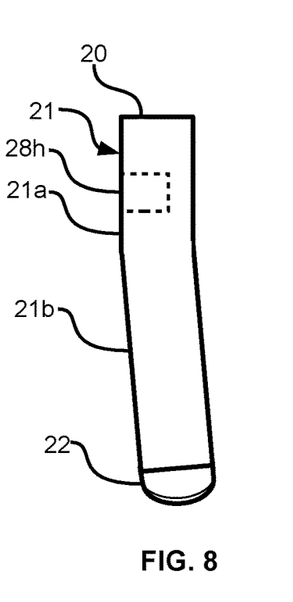
FIG. 8 is a front view of the alternate handle 21 with blade.

FIGS. 7 and 8 show an alternate handle 21 having convex top surface 20. Convex top surface 20 is for comfort, such as, for draping a thumb over the top of the handle while bee keeper fingers surround a handle lower part at lower guide surface 21b. Handle upper guide surface 21a and lower guide surface 21b function similar to handle 12 upper and lower guide surfaces 12a and 12b. Hole 28h is for receiving a cross member similar to cross member 18 in FIG. 1. Blade 22 is added for wedging between bee boxes, scraping excess propolis, or the like. Blade 22 is shown as curved in FIG. 8 and is located at a handle end such that a bee keeper may whack the handle's opposite end, here convex top surface 20, to force the blade between bee boxes and then wedge them apart. It is appreciated that blade shape and location on the apiary tool may change due to preference.

FIGS. 1 and 9-12 show operation of the present apiary tool 10. FIGS. 9-12 show the right side view of the apiary tool 10 in action. Handle 12 is shown in phantom lines so as to view the action of lever cam 16. First, a bee keeper removes the bee box lid (not shown), and then slides apiary tool 10 down onto bee box 1 as suggested by guide lines 7 in FIG. 1. Apiary tool 10 is now positioned with cross member 18 parallel to frames 8A and 8B inside bee box 1. Handles 11 and 12 are then tilted backward to about 45 degrees from vertical and cams 15 and 16 are slid between adjacent frames 8A and 8B and into respective gaps between frame sides and the adjacent bee box walls. Again, FIG. 1 shows a gap between bee box wall 3a and frame side 4a, and another gap between bee box wall 3b and frame side 4b. FIG. 9 shows a space between frame top bars 6a and 6b of side-by-side adjacent frames 8A and 8B.

Figure 10:
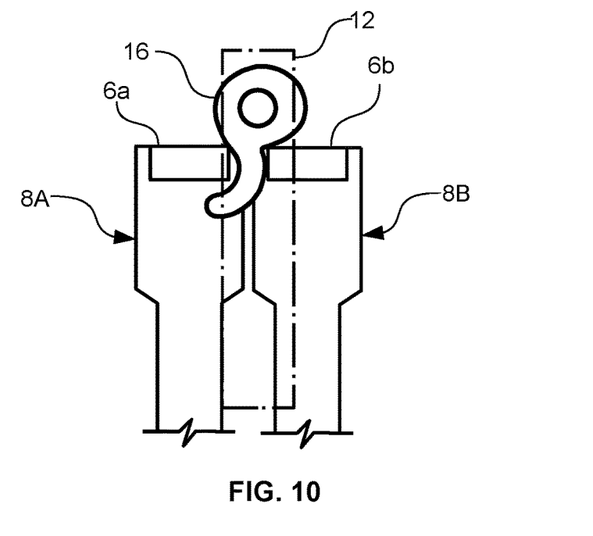
FIG. 10 is a right side view of the apiary tool in action in a second position.

Now turning to FIGS. 6 and 9-12, lever cam 16 is inserted so that cam 16c rests on frame 8A at or near point 32. Next, handle 12 is rotated down to a vertical position, as shown in FIG. 10, where point 32 remains seated against a frame 8A, and where rolling arcuate surface 16a is seated on adjacent frame 8B at or near point 30.

Figure 11:
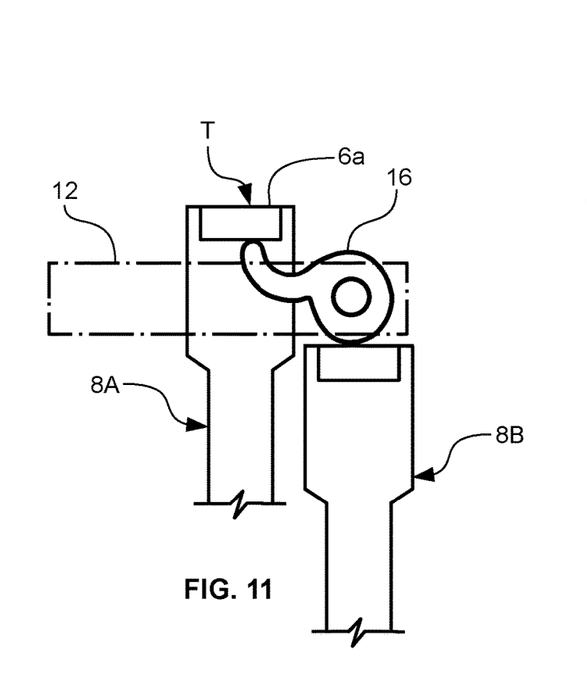
FIG. 11 is a right side view of the apiary tool in action in a third position.

Then, vertical lifting takes place as shown in FIG. 11, where handle 12 is rotated from vertical to about 90 degrees horizontal. Rolling arcuate surface 16a moves on top of the top bar 6b of frame 8B from about point to 30 to about point 31, thus holding down frame 8B and providing a fulcrum point for the lever action of handle 12 and lever cam 16. During rotation of handle 12, frame 8A top bar 6a moves along cam 16c to about point 33. Thus, lever cam 16 has a lever fulcrum point between 30 and 31 working in conjunction with a cam 16c rotating about the axis of rotation R of cross member 18. The rolling arcuate surface 16a and cam 16c turn with rotation of lever handle 12 to provide the desired vertical lift. This dual action, pop-up motion, is well over enough to swiftly break propolis tack between frame 8A and bee box 1 and between frame 8A and frame 8B. Handle 11 and cam 15 work similar as described for handle 12 and lever cam 16. When turning both handles, the two cams work in unison providing a unique vertical lift of about 150 pounds. Because frame 8A is vertically lifted there is no binding inside bee box 1 as there is when lifting one end or the other of a frame with conventional types of bee hive tools.

Frame 8A is now ready for removal, so the apiarist moves their thumb off handle 12 onto frame 8A at about thumb position "T" thereby balancing frame 8A on apiary tool 10 as shown in FIG. 11. Similarly, though not shown, the opposite hand thumb secures the other end of the frame against lever cam 15. In this way, the apiarist can continue vertical lifting of the frame to remove the frame from the bee box. The apiarist spare fingers may slide from the handles to frame 8A for additional support.

Figure 12:
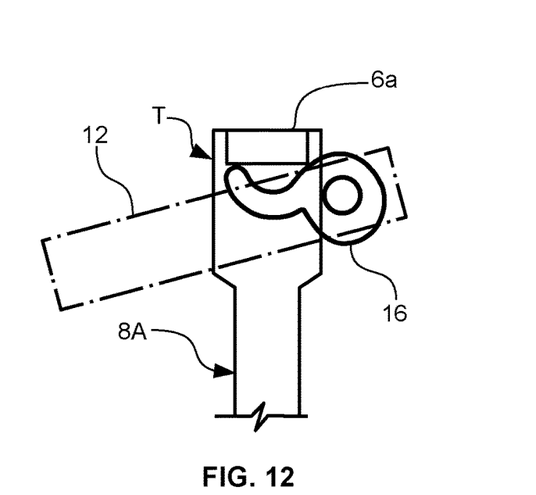
FIG. 12 is a right side view of the apiary tool in action in a forth position.

FIG. 12 shows frame 8A removed from a bee box and where an apiarist has relaxed handle 12 down from horizontal to about 5 to 30 degrees, and shifted frame 8A into three points of contact at each end of the apiary tool by pushing on frame 8A at new thumb position "T". Two points of contact are on lever cam 16 and one point with cross member 18, as shown in FIG. 12. Frame 8A has been pushed back so that frame side member 4a rests against cross member 18 which securely balances the frame on lever cam 16. The apiarist can now move and rotate their wrists and arms to inspect both sides of frame 8A for queens, larvae, honey production and health of the bee hive, all with the least amount of damage to the frames and bees, and without having to set the tool down. The present apiary tool can also be used where the lever cams point away from the bee keeper, in which case a spare finger slides off the handle onto the back side of the lifted frame to secure the frame for inspection.

In some instances, an adjacent frame 8B may not be available. Where frame 8A is adjacent to a parallel bee box wall, arcuate rolling surface 16a may rest on and fulcrum off of the bee box wall. Or, where frame 8A is not near a bee box wall or an adjacent frame, cross member 18 rests on tops of bee box walls 3a and 3b. Handles 11 and 12 still serve as levers to turn cross member 18 about it's axis of rotation thereby turning lever cams 15 and 16 to lift the frame.

The benefits of the present apiary tool can not be understated, they are very important. The present inventive apiary tool is easy to use with bee keeper's gloves. The present apiary tool does not have to be set down while a frame is lifted and removed from a bee box, inspected and transported, as with other prying tools. The apiary tool minimally contacts a frame, and this contact of the frame is away from where most bees gather so that minimal bee impact occurs. The apiary tool's lever cam provides dual action to swiftly and forcefully dislodging a single frame from propolis tack. The apiary tool lifts a frame vertically thus avoiding frames binding inside a bee box at an angle. And, the tool spans across a bee box so it can rest on top of bee box walls without squishing bees, unlike a large flat pry tool.

Figure 13:
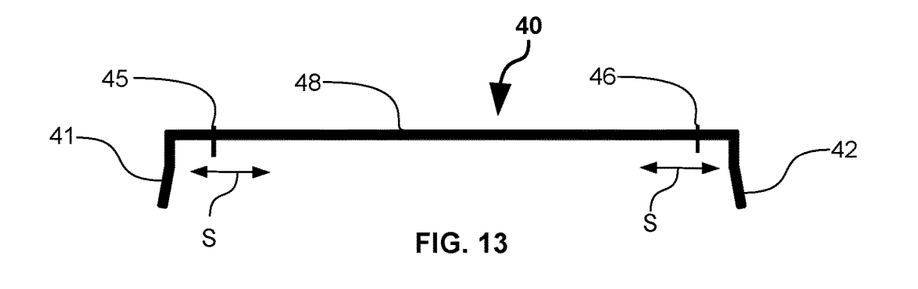
FIG. 13 is a front view of an alternative apiary tool 40.

FIG. 13 shows an alternative construction of an apiary tool 40 made of a metal rod having handles 41 and 42 bent from cross member 48. Lever cams 45 and 46 are attached to the cross member 48 in fixed or slidable attachment, as suggested by slide arrows S. Cross member 48 may be longer so that handles 41 and 42 are spaced farther from an outside of a bee box 1 to provide more finger clearance. As with the other drawings, FIG. 13 exemplary and not to scale.

Figure 14:
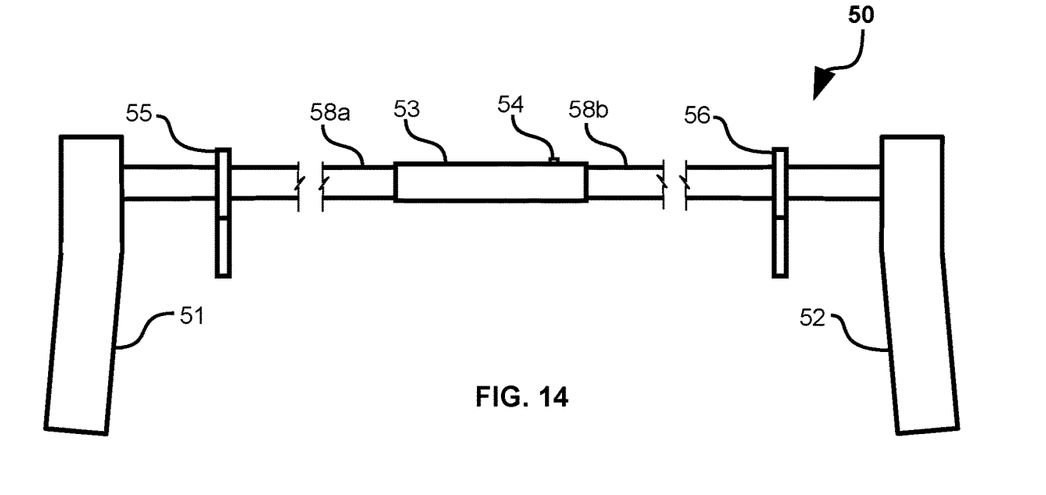
FIG. 14 is a front view of another alternative apiary tool 50.

FIG. 14 shows a collapsible apiary tool 50 having handles 51, 52, lever cams 55, 56 attached to respective cross members portions 58a and 58b. Cross member portions 58a and 58b are axially connected via sleeve 53 and set screw 54, where sleeve 53 may be fixed to cross member portion 58a, such as by welding. In practice, set screw 54 is loosened to disconnect cross member portions 58b so that the tool may be stored in a tool box. It is appreciated that collapsing may be achieved via a telescoping cross member, or separable parts, or by other means known to one of ordinary skill.

The preferred embodiments discussed herein may require modification and changes varied to fit particular or nonstandard bee boxes or houses to which the invention is applied. Consequently, the invention is not limited to the examples chosen for the purposes of disclosure, and covers changes and modifications which do not constitute departures from the true spirit and scope of this invention.

The invention claimed is:

1. An apiary tool for vertically lifting a frame from a bee box comprising:
   a cross member that is elongate and has a central axis of rotation in an elongate direction,
   a first handle and a second handle,
   wherein the cross member extends between and is connected perpendicular to the first handle and the second handle, the cross member longer than the bee box in a horizontal direction parallel to the frame, and
   a lever cam, where the lever cam is attached to and crosswise to the cross member and in between the first handle and the second handle, and
   wherein the lever cam rotates with the cross member about the central axis of rotation, and
   wherein the first handle and the second handle guide the apiary tool onto the bee box locating the first handle and the second handle outside opposite walls of the bee box, and the lever cam extending inside the bee box, and
   wherein the apiary tool lifts upward on the frame while holding down an adjacent frame when the first handle and the second handle are rotated about said central axis of rotation.

2. The apiary tool of claim 1, wherein the lever cam comprises a cam, the cam sized to extend downward between the frame and the adjacent frame in the bee box and underneath a top bar of the frame, and wherein the cam pushes upward on the top bar when the first handle and the second handle are rotated.

3. The apiary device of claim 2, wherein the lever cam further comprises an arcuate rolling surface that holds down the adjacent frame when the first handle and the second handle are rotated.

4. The apiary tool of claim 3, wherein the lever cam is perpendicular to the cross member and is 3/16 inch thick.

5. The apiary tool of claim 1, wherein the lever cam comprises two lever cams, each lever cam having a cam capable of pushing upward on and underneath a portion of the frame.

6. The apiary tool of claim 5, wherein the two lever cams are attached to the cross member, and are spaced from each other, and where at least one of the two lever cams is sized to fit between a wall of the bee box and an adjacent side member of the frame below a frame resting ledge of the bee box.

7. The apiary tool of claim 5, wherein one of said lever cams is located 0.75 inch to 3 inches from the first handle, and the second of said lever cams is located 0.75 inch to 3 inches from the second handle.

8. The apiary tool of claim 1, wherein the first handle and the second handle each have an upper guide surface that are parallel to each other, and wherein the first handle and the second handle each have a lower guide surface that flare outwardly with respect to each other, and wherein the upper and lower guide surfaces are capable of guiding the apiary tool onto the bee box.

9. The apiary tool of claim 1 further comprising a blade attached to the first handle or the second handle, and wherein the apiary tool is collapsible.

10. An apiary tool for vertically lifting a frame having a top bar from a bee box having a top bar resting ledge, comprising:
    a cross member that is elongate and has a central axis of rotation in the elongate direction,
    a first lever cam and a second lever cam,
    a first handle and a second handle, wherein the first handle and the second handle each have an upper guide surface that are parallel to each other and the cross member extends there-between, and the first handle and the second handle each have a lower guide surface that flare outwardly with respect to each other, and wherein the upper and lower guide surfaces guide the apiary tool onto the bee box, and
    wherein the cross member is longer than the frame top bar and is connected to the first handle and the second handle and extends there-between, and
    wherein the first lever cam and the second lever cam are attached to the cross member in spaced apart relationship and rotate with the cross member about the central axis of rotation, and
    wherein the first lever cam has a cam with a gliding surface that extends below the top bar resting ledge, the gliding surface between a first point and a second point, second point further from the central axis of rotation than the first point, and
    wherein rotation of the first handle causes the first lever cam to slide the frame top bar from the first point to the second point when lifting the frame, and
    wherein the first lever cam and the second lever cam are capable of pushing upward on the frame in the bee box when the first handle and the second handle are rotated about said central axis of rotation.

11. The apiary tool of claim 10, wherein the second lever cam is crosswise to the cross member, and the second lever cam has a cam with a gliding surface, the second lever cam gliding surface between a first point and a second point on the second lever cam, and where the second lever cam second point is further from the central axis of rotation than the second lever cam first point, and
    wherein rotation of the second handle causes the second lever cam to slide the frame top bar from the first point to the second point on the second lever cam to vertically lift the frame.

12. The apiary tool of claim 10, wherein the first lever cam has an arcuate rolling surface, wherein the arcuate rolling surface rotates on top of an adjacent frame while the first lever cam is pushing upward on the frame.

13. The apiary tool of claim 12, wherein the first lever cam is comma shaped, and the arcuate rolling surface is convex shaped.

14. The apiary tool of claim 12, wherein the second lever cam comprises a cam and an arcuate rolling surface, the cam of the second lever cam having a gliding surface located on an opposite side of the second lever cam from the arcuate rolling surface.

15. The apiary tool of claim 10, wherein the first lever cam is sized to fit in a gap between a side member of the frame and an adjacent wall of the bee box below the top bar resting ledge of the bee box, and the second lever cam is sized to fit in a gap between an opposite side member of the frame and an opposite wall of the bee box below an opposite top bar resting ledge of the bee box.

16. The apiary tool of claim 15, where the cross member is 3/8 inch diameter, and the first lever cam is 3/16 inch thick.

17. The apiary tool of claim 10, wherein the first handle and the second handle are elongate, and the cross member is attached adjacent to an end the first handle and adjacent to an end of the second handle.

18. The apiary tool of claim 10, where the first lever cam has an elongate axis positioned 10 to 40 degrees with respect to the first handle, and the second lever cam has an elongate axis positioned 10 to 40 degrees with respect to the second handle.

\* \* \* \* \*